United States Patent [19]
Gillham, Sr.

[11] 4,136,447
[45] Jan. 30, 1979

[54] CORING APPARATUS

[76] Inventor: Robert E. Gillham, Sr., 732 N. Halifax Ave., Apt. 101, Daytona Beach, Fla. 32018

[21] Appl. No.: 870,748

[22] Filed: Jan. 19, 1978

[51] Int. Cl.² .................... B26B 27/00; B26B 29/02
[52] U.S. Cl. ........................... 30/287; 17/1 F; 30/302; 30/316
[58] Field of Search .............. 30/90.6, 279 R, 280, 30/287, 288, 113.1, 113.3, 316, 302, 123.5, 174; 17/1 F

[56] References Cited

U.S. PATENT DOCUMENTS

| 1,821,971 | 9/1931 | Ichijyo | 30/279 R |
| 2,235,575 | 3/1941 | Edwards | 30/90.6 X |
| 2,263,531 | 11/1941 | Kevorkian | 30/316 X |
| 2,548,165 | 4/1951 | Koch | 17/1 F |
| 2,577,407 | 12/1951 | Dent | 30/280 |
| 2,616,172 | 11/1952 | Parker | 30/288 X |
| 3,169,315 | 2/1965 | Mankovitz | 30/90.6 |
| 3,257,725 | 6/1966 | Dignard | 30/287 X |

Primary Examiner—Nicholas P. Godici

[57] ABSTRACT

A frankfurter coring apparatus for coring the center out of a frankfurter is provided with a handle connected to an annular cutting blade and to a straight edge cutting blade. A pair of frankfurter guides guide a frankfurter to the annular cutting blade centered thereon, while the straight edge cutting blade cuts an incision through the frankfurter to the annular cutting blade. The frankfurter core and cored frankfurter are guided on both sides of the blades.

8 Claims, 3 Drawing Figures

U.S. Patent    Jan. 30, 1979    4,136,447
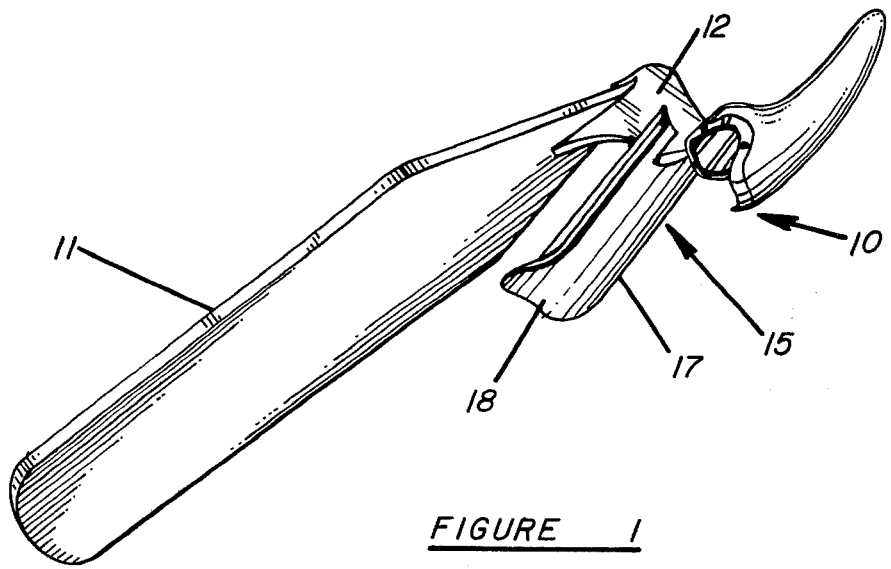
FIGURE 1
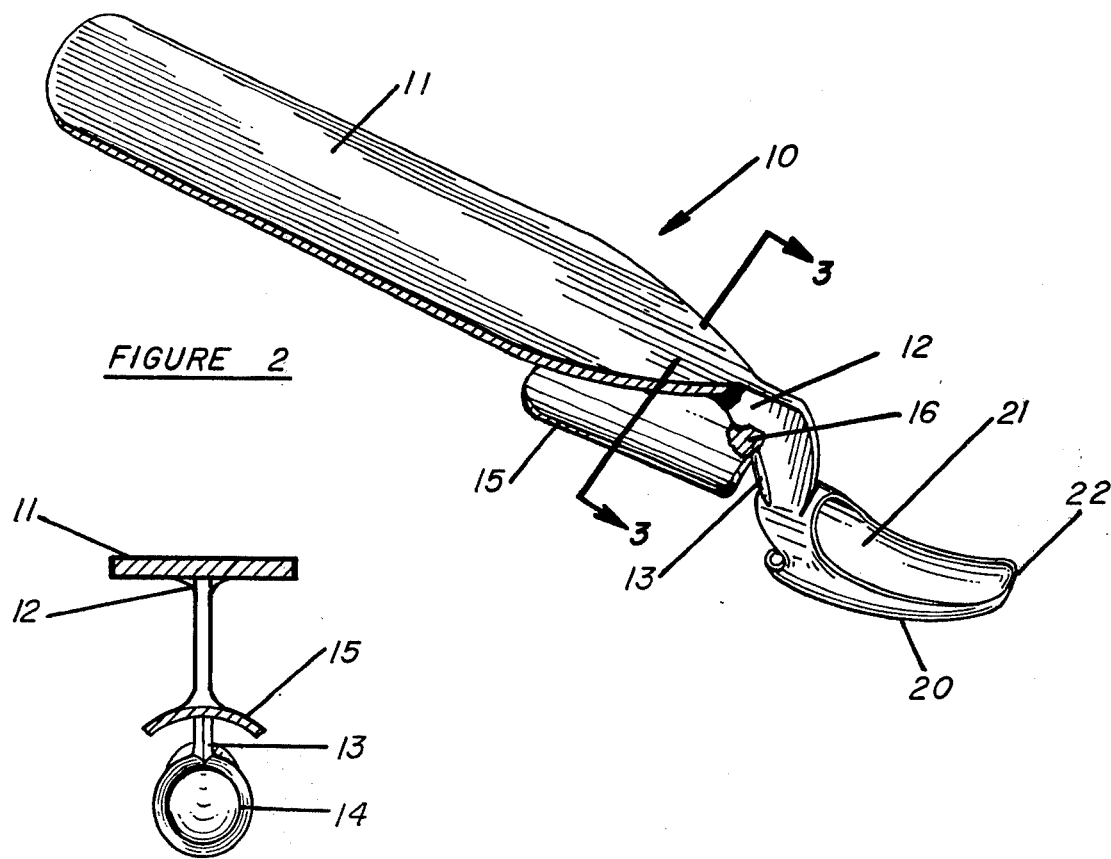
FIGURE 2
FIGURE 3

CORING APPARATUS

BACKGROUND OF THE INVENTION

The present invention relates to coring devices for coring food, and especially to a coring device for coring frankfurters along the elongated center axis of the frankfurter.

In the past, a great many cutting devices have been provided for coring the center from foods, such as fruits, and the like, which usually includes a specially designed coring blade for removing the core from the food. One prior U.S. Pat. No. 2,548,165 provides a kitchen utensil for coring frankfurters, in which the frankfurter is inserted in a casing, and then a hollow cylindrical blade having a sharpened edge is driven through the center of the frankfurter to core the frankfurter, which is prevented from expanding by the casing.

Other coring patents may be seen in U.S. Pat. No. 2,751,864 for a banana coring extraction tool in which a thin walled tubular body is adapted to be inserted axially into a banana for removing the core. In U.S. Pat. No 2,557,191 for a potato punch, which has a handle with a shank extending therefrom and an annular blade on the end of the shank for thrusting into potatoes for the purpose of extracting small cores therefrom. U.S. Pat. No. 2,257,202 teaches a combination fruit corer and gouge for apples, grapefruit or the like, having an annular tapered blade for coring into apple type fruit and a tapered blade at the opposite end for removing orange or grapefruit sections. U.S. Pat. No. 1,975,200 teaches an attachment for paring knives in which a knife has an attachment for removing the stem end or eyes of apricots.

In contrast to the prior art, the present invention teaches a frankfurter coring device having an annular coring blade connected to a straight edge cutting blade with guides positioned to guide a frankfurter axially onto the annular coring blade and to guide the core and frankfurter as the frankfurter is being pushed through the coring blades. Thus, a tool which is simple to manufacture and use is provided coring foods, which then may be filled with cheese, or the like.

SUMMARY OF THE INVENTION

The present invention relates to a coring apparatus which has an elongated handle with a blade supporting shank attached thereto which shank has a straight edge cutting blade formed therein, and has an annular cutting blade attached to the end thereof. A frankfurter guide is mounted to the shank for directing a frankfurter into the annular and straight edge cutting blades centered on the elongated axis of the frankfurter and a second guide is connected to the annular blade for guiding the frankfurter and core as it passes through the annular blade so that the frankfurter may have the core removed and an elongated incision made into the frankfurter to the core.

BRIEF DESCRIPTION OF THE DRAWINGS

Other objects, features, and advantages of the present invention will be apparent from the written description and the drawings, in which:

FIG. 1 is a bottom perspective view of a coring apparatus in accordance with the present invention;

FIG. 2 is a top perspective view of the coring apparatus of FIG. 1; and

FIG. 3 is a sectional view taken on the line 3—3 of FIG. 2.

DESCRIPTION OF THE PREFERRED EMBODIMENT

Referring to FIGS. 1 through 3 of the drawings, a frankfurter coring apparatus 10 is illustrated having an elongated handle 11, which is held by the user, and which has a shank 12 attached to one end thereof, and extending in a generally perpendicular direction from the handle. The shank 12 has a straight edge cutting blade 13 formed on a portion thereof by the sharpening of the edge directly over an annular blade 14, which is attached to the shank 12 at the end of the straight edge blade 13. The shank 12 has a frankfurter guide 15 fixedly attached thereto at 16, and an arcuate or rounded transverse surface 17, with a turned up entry ramp 18 for guiding a frankfurter along its longitudinal axis towards the annular cutting blade 14 and into the annular coring blade 14, which is driven thereinto to form an annular bore cutting out a cored portion from the frankfurter, while the supporting shank having the blade 13, cuts an incision along the frankfurter from the outer perimeter to the cored portion being formed by the annular blade 14. As the frankfurter slides through the coring annular blade 14, a portion of the blade continues as an after guide 20, having an arcuate surface 21 curved transversely to the elongated guide 20, and curving upwards from the annular cutter 13, so that the core passing through the annular cutter 14 is guided by the curved surface 21 of the guide 20, and curves in a generally upward direction towards the end 22 of the guide 20. The frankfurter also follows the outer edge around the guide 20. The cutting blade 13 is at an angle so that the leading edge cuts the skin of the frankfurter just after the prongs on the cutting (ring) or blade 14 passes through.

It can be seen at this point that a frankfurter can be axially slid onto the guide 17 having the arcuate portion 10, which aligns the frankfurter with the blade 14 and driven thereinto, driving the core along the curved surface 21 of the after guide 20, along with the cored frankfurter which comes out the other end fully cored for the insertion of cheese, or any other cooking substance desired. A simple tool of this nature can be advantageously made from one molded polymer or cast or forged aluminum or steel, or any other material as desired. The cutting blade can also be mounted, for continuous operation for large scale production, if desired, without departing from the spirit and scope of the invention. Accordingly, the present invention is not to be construed as being limited to the forms shown herein, which are to be consired illustrative rather than restrictive.

I claim:

1. A coring apparatus comprising in combination;

a support member;

a shank fixedly attached to said support member and extending therefrom;

a straight edge cutting blade fixedly attached to said shank;

an annular cutting blade fixedly attached to and supported by said straight edge cutting blade; and guide means attached to said coring apparatus for guiding an elongated member axially into said annular and straight edge cutting blades, thereby coring said elongated member with said annular cutting blade, and cutting an incision to said cored portion of said elongated member with said straight edge coring blade, said guide means including an elongated first guide member having an arcuate surface attached to said shank in front of the cutting edge of said annular cutting blade and in front of said straight edge blade, and a second guide member attached to the rear portion of said annular cutting blade.

2. The apparatus in accordance with claim 1, in which said second guide member extends arcuately from said annular cutting blade.

3. The apparatus in accordance with claim 2, in which said second elongated guide member has an arcuate transverse surface.

4. The apparatus in accordance with claim 3, in which said straight edge cutting blade is formed into said shank.

5. The apparatus in accordance with claim 4, in which said first guide member has an arcuate entry ramp formed thereon.

6. The apparatus in accordance with claim 5, in which said coring apparatus, straight edge cutting blade, and annular cutting blade are made of steel.

7. The apparatus in accordance with claim 6, in which said shank extends in a generally perpendicular direction from said handle, and said annular glade faces in a generally perpendicular direction to said handle.

8. The apparatus in accordance with claim 7, in which said straight edge cutting blade is angled.

* * * * *